United States Patent [19]

Kantor et al.

[11] Patent Number: 5,075,473

[45] Date of Patent: Dec. 24, 1991

[54] PROCESS FOR THE PREPARATION OF ALUMINUM OXIDE CARBOXYLATE POLYMERS CONTAINING AT MOST TWO PER CENT BY WEIGHT OF ESTER

[75] Inventors: István Kantor; Ferenc Dénes, both of Komárom; János Kis, Almásfüzitö; János Auer, Komárom; Lajos Péterfy, Veszprém; L. Péter Farkas, Veszprém; Antal Mátravölgyi, Veszprém; József Horváth, Veszprém; József Toth, Komárom, all of Hungary

[73] Assignees: Komaromi Koolajipari V., Komárom; Magyar Asvanyolaj-Foldgaz Kiserleti Intezez, Veszprém, both of Hungary

[21] Appl. No.: 521,048

[22] Filed: May 3, 1990

[30] Foreign Application Priority Data

May 3, 1989 [HU] Hungary ............... 2251-2076/89

[51] Int. Cl.$^5$ ............................................. C07F 5/06
[52] U.S. Cl. ............................................. 556/179
[58] Field of Search ........................................ 556/179

[56] References Cited

U.S. PATENT DOCUMENTS

| | | | |
|---|---|---|---|
| 2,744,074 | 5/1956 | Theobald | 260/2 |
| 2,925,430 | 2/1960 | Stedehouder et al. | 260/414 |
| 2,979,497 | 4/1961 | Jacobus Rinse | 556/179 |
| 3,054,816 | 9/1962 | Jacobus Rinse | 260/448 |
| 4,069,236 | 1/1978 | Hutchinson et al. | 260/414 |

FOREIGN PATENT DOCUMENTS 1555831 1/1969 France .
806113 12/1958 United Kingdom .
825878 12/1959 United Kingdom .

*Primary Examiner*—Jose G. Dees
*Assistant Examiner*—Porfirio Nazario
*Attorney, Agent, or Firm*—Herbert Dubno; Jonathan Myers

[57] ABSTRACT

The invention relates to a novel process for the preparation of aluminum oxide carboxylate polymers containing at most 2% by weight of ester by reacting an aluminum alkoxide of the general formula $Al(OR)_3$, wherein R stands for a $C_{2-5}$ alkyl group, dissolved in an aromatic or aliphatic hydrocarbon with a solution of a $C_{8-22}$ aliphatic or alicyclic monocarboxylic acid or carboxylic acid mixture and water in a $C_{2-5}$ alkanol and removing the alkanol(s).

The process according to the invention comprises introducing the solution of the aluminum alkoxide to a tube reactor having a 10 to 200 length/diameter ratio at a temperature exceeding by 15° to 50°C. the boiling point of the higher boiling alkanol among that corresponding to the alkanol component of aluminum alkoxide and that used as solvent; then feeding in the alkanolic solution containing the monocarboxylic acid and water, wherein the aluminum/monocarboxylic acid mole ratio is at least 10:1 and the aluminum/water mole ratio is at least 10:1; removing the alkanol formed in the reaction; returning the reaction mixture into the tube reactor; repeating this operation until the mono-carboxylic acid/aluminum mole ratio reaches 0.95 to 1.05 and the water/aluminum mole ratio reaches 0.9 to 1.0; and then making the product obtained free from alkanol.

10 Claims, No Drawings

PROCESS FOR THE PREPARATION OF ALUMINUM OXIDE CARBOXYLATE POLYMERS CONTAINING AT MOST TWO PER CENT BY WEIGHT OF ESTER

FIELD OF THE INVENTION

This invention relates to a novel process for the preparation of aluminum oxide carboxylate polymers containing at most 2% by weight of ester.

BACKGROUND OF THE INVENTION

Aluminum oxide carboxylate polymers are prepared by reacting aluminum alkoxides with fatty acids and occasionally with water. The compounds thus formed were characterized by the formula $$[-Al(X)-O]_n$$

in the U.S. Pat. No. 2,744,074 (by Theobald); a similar structure, i.e. $[O=Al-X]_n$ was proposed in the U.S. Pat. No. 2,925,430 by (Stedebauder and Viveen). In these formulae X means an organic acid radical and n is the degree of polymerization being at least 16. In the above cases a molecule of the formula $$[-Al(X)-O]_n-R,$$

wherein R stands for an alkyl group, is formed in the course of chain closure. According to our measurements concerning the number of alkoxy groups bound, n is higher than 25 in the above formula.

In the U.S. Pat. No. 2,979,497 Rimse characterized the aluminum oxide carboxylate polymers as a cyclic trimeric aluminum oxide form rendered probable by the very low alkoxy content of the pure compounds. However, this was not supported by any other measurement relating to the structure elucidation. The molecular weight measurement published in the U.S. Pat. No. 4,069,236 (by Hutchison) support the polymeric structure. Thus, the term "polymer" being more common in our opinion, is used in the present description.

In general, these compounds are used as gel-forming and gel-thickening agents for alkyd resins, glycerides, mineral oils and other hydrocarbons. Nowadays, their utilization is becoming increasingly widespread.

At present, the most important utilization of the aluminum complexes is in the production of fats. However, increasingly significant amounts are used in the printing, leather and cosmetic industries as well as in the production of fine chemicals. Aluminum complexes are suitable for several polymer compositions, as well as in the preparation of synthetic resins and plastics. The advantageous features of these compounds were shown in the Hungarian patent specification No. 192,257.

A known method of preparation of aluminum oxide carboxylate polymers proceeds via basic aluminum salts. According to the U.S. Pat. No. 2,925,430 basic aluminum salts of the formula $(HO)_2Al-X$, wherein X stands for an organic acid radical, are reacted with alkoxides of the formula $(RO)_2Al-X$, wherein R stands for a $C_{1-10}$alkyl group. In these reactions inert organic solvents are used and the alkanol liberated is distilled out of the system to obtain aluminum oxide carboxylate polymers of the formula $$HO-[-Al(X)-O]_n-R,$$

wherein X, R and n are as defined above.

Another preparation method of aluminum carboxylate polymers is published in the French patent No. 1,555,831, in the U.S. Pat. No. 2,744,074 as well as in the British patent specification No. 806,113. In these processes the carboxylic acid used is added in a molar ratio higher than one in relation to the aluminum alkoxide. The carboxylic acid goes into reaction with the aluminum alkoxide, whereas an alkanol of the general formula R-OH, wherein R stands for an alkyl group, is formed in the reaction. When the carboxylic acid is added in a molar ratio exceeding one and the temperature of the reaction is increased to 120° to 350° C., then the aluminum compound is shifted towards the aluminum oxide carboxylate polymer and an ester is formed. The above process is illustrated by the following reaction equation:

$$n\,Al(OR)_3 + 2n\,XH \longrightarrow [-O-Al(X)-]_n + n\,RX + 2n\,R-OH$$

wherein R, X and n are as defined above.

A common feature of these processes is that in the course of the reaction a part of the carboxylic acid is utilized for ester formation and for the completion of polymerization at least a two-fold amount of the carboxylic acid is required. According to the references listed, molar excesses of 2.4 to 2.6 are commonly used.

According to a third method of the preparation of aluminum oxide carboxylates the aluminum alkoxide is brought into reaction with water and an organic carboxylic acid.

According to the British patent specification No. 825,878 aluminum alkoxide is dissolved in hot oil, then water dissolved in the alkanol is slowly added while maintaining the mixture near to the temperature of distilling off of the alkanol. After the addition the mixture is refluxed for several hours, then its temperature is increased to 140° to 150° C. whereby it becomes free from the alkanol. To the product thus obtained the corresponding carboxylic acid or carboxylic acid mixture is weighed at a lower temperature and after reaction occurs the mixture is freed from the solvent at a high temperature to obtain the aluminum oxide carboxylate polymers. The process described is complicated and tedious. During the mixing-in of the aqueous alkanol the precipitation of a solid-phase aluminum compound is observed which decreases the amount of aluminum compounds in the product and which can be separated only by filtration. In addition, the circuitous process favors ester formation and therefore even 15 to 25% by weight of ester can be present in the product which appears as a deficiency of the carboxylic acid in the polymer and can be corrected only by adding an additional amount of carboxylic acid. For this reason the carboxylic acid/aluminum mole ratio published in the examples reaches 1.7 instead of the theoretical value of 1.0. In the case of reactions carried out in our own experiments under similar conditions the above problems similarly occurred (Example 1).

According to the U.S. Pat. No. 2,979,497 aluminum alkoxide is dissolved in an aromatic solvent, then the alkanolic solution of the corresponding carboxylic acid and water is slowly added to the refluxing solution. After carrying out the reaction, the product is freed from alkanol at a high temperature of 140° to 180° C. In this process the precipitation of solid-phase aluminum compound cannot be avoided and the amount of ester formed as a side product reaches as high as 10% by weight.

The preparation of cyclic aluminum alkoxy and phenoxy compounds is described in the U.S. Pat. No. 3,054,816. Steam or a mixture containing steam diluted with alcoholic vapours are used to the condensation reaction of aluminum alkoxide. In the course of the reaction two moles of alkanol liberated in relation to one mole of water as well as the alkanol used for the dilution are continuously distilled off or are distilled off at the end of the reaction. On reacting an alkoxide in the vapor phase with steam, a solid product is obtained. Aromatic solvents or alkanols are employed as solvents for this reaction. This patent describes the preparation of cyclic aluminum oxide acetate carried out by adding acetic acid to the solution of cyclic aluminum oxide isopropoxide.

According to the U.S. Pat. No. 4,069,236 aluminum oxide carboxylate polymers are prepared from aluminum alkoxide by using an equimolar amount of water and a carboxylic acid is added at 130° C. It is obvious from the examples that the precipitation of solid aluminum compounds cannot be eliminated. The product must be separated by filtration from the system. According to our own repeated experiments, the amount of ester formed in the above process exceeds 5% by weight.

The continuous preparation of cyclic aluminum oxide carboxylate trimers is described in the Hungarian patent No. 192,257. According to this process the reaction of aluminum oxide with water and carboxylic acids is simultaneously realized in a phase fluidized by an inert carrier gas. In comparison to the processes discussed above, this latter process is suitable for preparation of products with a relatively low proporation, e.g. 2 to 5% by weight, of ester. Due to the displacements of the addition ratios accidentally occurring during the continuous process the equimolar reaction of aluminum alkoxide with water and carboxylic acid is problematic since a gel formation can be started in the reactor which endangers the operation and the stability of the product.

A common feature of the processes of the prior art is that, in addition to the desired product, the formation of RX ester, wherein R is as defined above, cannot be eliminated or is even necessitated owing to the nature of these processes. J. Rinse (Paint Technology Vol. 28, No. 4) describes this reaction by the following scheme:

>Al+XAl<→>Al—O—Al<+RX wherein R and X are as defined above.

This ester formation is particularly accelerated at higher temperatures, a fact supported also by our own experiments (see Example 4 compared to Example 3). This is the reason for the high yields of esters obtained according to the French patent No. 1,558,831, U.S. Pat. No. 2,744,074 and British patent specification No. 806,113. The significant ester formation should be taken in account at low temperatures too, when a reaction can freely proceed between the alkanol and carboxylic acid. It is likely that the latter reason plays a role in causing the amount of ester obtained as a side product in the processes discussed above to be high since these processes require long reaction times.

We have tried in our experiments to diminish the amount of ester, since when the carboxylic acid is used in an equimolar amount, the carboxylic group as functional group will partially be absent from the aluminum oxide carboxylate polymer product and the supplementation of it will necessitate an additional operation step lowering the facility of the process. Besides, the formation of an ester consuming carboxylic acid and alkanol represents an economic loss in itself.

OBJECT OF THE INVENTION

Thus, it is an object of the present invention to provide an improved process for the preparation of aluminum oxide carboxylate polymers containing at most 2% by weight of ester by reacting an aluminum alkoxide of the formula $Al(OR)_3$, wherein R is a $C_{2-5}$alkyl group, dissolved in an aromatic or aliphatic hydrocarbon with a solution of a $C_{8-22}$aliphatic or alicyclic monocarboxylic acid or carboxylic acid mixture and water in a $C_{2-5}$alkanol and removing the alkanols.

DESCRIPTION OF THE INVENTION

According to the invention the solution of aluminum alkoxide is introduced to a tank reactor kept under a pressure of 0.2 to $0.7 \times 10^5$ Pa, then is led as a circulated flow at a temperature exceeding by 15° to 50° C. the boiling point of the higher-boiling alkanol of the alkanol component of aluminum alkoxide and used as solvent to a tube reactor having 10 to 200 length/diameter ratio and connected with the tank reactor; simultaneously, at the entrance of the tube reactor, the alkanolic solution of the monocarboxylic acid and water containing at least 35% by weight of alkanol is continuously added, the aluminum/monocarboxylic acid molar ratio being at least 10:1 and the aluminum/water molar ratio being at least 10:1; then the foam phase obtained is led at a rate of 1 to 10 m/sec (calculated as liquid phase) through the tube reactor fitted also with guide elements suitably strengthening the turbulence; then the mixture is led to the tank reactor equipped with a stirrer, where the alkanol formed in the reaction is removed in a known way whereas the reaction mixture is returned to the tube reactor; and this operation is repeated until the monocarboxylic acid/aluminum mole ratio reaches 0.95 to 1.05 and the water/aluminum mole ratio becomes 0.9 to 1.0; then the product obtained is freed from the alkanol at a temperature exceeding at least by 30° C. the boiling point of the higher boiling alkanol in the alkanol component of aluminum alkoxide and the solvent.

The aim of the process developed according to the invention is to prepare aluminum oxide carboxylate polymers from aluminum alkoxides by reaction with equimolar amounts of water and carboxylic acid. The summarized scheme of the reactions can be shown by the following equation:

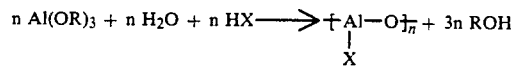

wherein n, R and X are as defined above.

When the reaction is carried out as described and the alkanol is removed nearly at the moment of its formation together with the alkanol used as solvent, then the product obtained is practically free from alkanol, does not contain any alkoxy group either in free or bound form and has a minimum ester formation. The precipitation of a solid phase necessitating a filtration by the hydrolysis of the aluminum alkoxides and causing a loss of aluminum is also inhibited.

The process according to the present invention is based on the rapid carrying out the reaction and immediate removal of the alkanol from the system whereby the ester formation is decreased to the minimum level when the temperature conditions are chosen as defined above. It is also essential to avoid the formation of a local water excess inducing hydrolysis and simultaneously to ensure the 1:1 mole ratio of aluminum/water.

In the process according to the present invention, the aluminum alkoxide weighed in by weight and the hydrocarbon solvent are introduced to a stirred tank reactor. The water and carboxylic acid required for the reaction are dissolved in an alkanol. It is suitable to use the alkanol corresponding to the alkoxy group of the aluminum oxide for this purpose. Though water and monocarboxylic acid can be separately added, it is advantageous to use them as a common solution. The alkanol content of the solutions is at least 35% by weight.

The mixture placed in the tank reactor is adjusted to a temperature exceeding by 15° to 50° C. the boiling point of the alkanol used for preparing the solutions, then it is circulated through a tube reactor having a 10 to 200 length/inner diameter ratio containing in its inner part also guide elements increasing the turbulance of the flow. At the entrance of the tube reactor the akanolic solution of water and carboxylic acid is injected into the circulated flow. The material flow of the circulated flow and the injected solution, respectively is selected in such a way that the molar flow of aluminum compounds entering the tube reactor is at least the 10-fold of the molar flow of the entering water and/or carboxylic acid and a linear flow rate of 1 to 10 m/sec develops in the tube reactor as calculated to the liquid phase.

In the tube reactor, the alkanol content of the solution injected as well as the alkanol formed in the chemical reactions appear as in the vapor state and form a foam phase. The foam phase is returned to the tank reactor which is suitably kept under reduced pressure. In the tank reactor the foam phase is decomposed, the vapours are removed and condensed whereas the liquid phase is returned into the tube reactor. All these operations are carried out until a nearly equimolar carboxylic acid/water ratio (0.95 to 1.05 for the carboxylic acid and 0.9 to 1.0 for the water) is achieved in relation to the weighed-in aluminum alkoxide.

Then, the circulation is stopped and, when necessary, the product being in the tank reactor is heated to a temperature between 130° C. and 170° C. at a rate of at least 20° C./hour and the product is made free from the alkanol at this temperature under reduced pressure. The product prepared by using fixed parameters according to the method discussed above contains less than 2% by weight, usually less than 1% by weight of ester formed from the alkanol and carboxylic acid used; the total amount of the free and bound alkoxy groups is lower than 1% by weight in the product. The product is lustrous and does not contain any solid aluminum compound.

SPECIFIC EXAMPLES

The process according to the invention is shown in Examples 2, 3, 5 and 6 whereas Examples 1 and 4 are given for comparison.

The hydrocarbon solvent used to introduce the aluminum alkoxide into the polymer-forming reaction preferably has a boiling point that is at least 80° C. higher than that of the alkanol having the higher boiling point among the alkanol corresponding to the alkanol component of the aluminum alkoxide and the alkanol used as solvent. A preferred solvent is hydrogenated Soviet heavy oil with a viscosity of 100 mm/sec at 40° C., a viscosity index of 85 and an aniline point of 99° C./160° C.

EXAMPLE 1

162 g (1 mol) of aluminum ethoxide and 340 g of white oil of technical grade (ISO VG 15) are weighed into a heatable round-bottom glass flask of 4 liters volume fitted with a thermometer. The mixture is thermostated at 80° C. and circulated through a finned-wall glass tube reactor of 8 mm in diameter and 200 mm in length at a volumetric flow rate of 5000 ml/min by using a circulating pump under continuous stirring. Before entering the tube reactor, first a solution thermostated at 60° C. containing 17.1 g (0.95 mol) of water and 325 g of ethanol and subsequently a solution similarly thermostated at 60° C. containing 270 g (0.95 mol) of stearic acid and 270 g of ethanol are injected to the above material flow by the means of a feed pump at a feeding rate of 50 ml/min. During the introduction of the solutions a foam phase is formed in the tube reactor which is due to the evaporation of the alkanol content and the formation of alkanol vapors liberated from the reactions. This foam is decomposed in the round-bottom flask, its vapors are removed, condensed and taken up in a separate receiver. During the introduction of the first solution containing water the circulating material flow slowly becomes opalescent because of precipitation of a solid phase. After introduction of the second solution the circulation is stopped, the round-bottom flask is placed under a reduced pressure of $0.5 \times 10^5$ Pa, the temperature is increased to 140° C. and the product is freed from alkanol over 30 minutes.

In this way 680 g of an opalescent product are obtained which contains 4.0% by weight of aluminum and 8.2% by weight of ethyl stearate ester. From the process 700 g of analytical anhydrous ethanol are recovered.

EXAMPLE 2

288 g (1 mol) of aluminum pentoxide and 340 g of hydrogenated Soviet heavy oil (with a viscosity of 100 mm²/sec at 40° C., viscosity index of 85 and aniline point of 99° C./160° C.) are stirred and circulated through the tube reactor at a rate of 5000 ml/min. The equipment is maintained under a pressure of $0.5 \times 10^5$ Pa from the beginning. A solution at 95° C. temperature containing 17.1 g (0.95 mol) of water, 350 g (1.00 mol) of technical-grade naphthenic acid mixture and 370 g of pentyl alcohol are added into the tube reactor at a feeding rate of 50 ml/min. After addition the mixture is liberated from the alkanol at 170° C. as described in Example 1.

In this way 748 g of a visually pure product are obtained which contains 3.6% by weight of aluminum and 1.2% by weight of ester. From the process 610 g of anhydrous pentyl alcohol are recovered.

EXAMPLE 3

In the equipment described in Example 1 a mixture of 207 g (1 mol) of aluminum isopropoxide and 203 g of hydrogenated (Soviet) heavy oil at 115° C. temperature are circulated at a rate of 10 l/min under a pressure of $0.5 \times 10^5$ Pa according to Example 2 and reacted with a solution at 60° C. temperature containing 17.1 g (0.95 mol) of water, 285 g (1,00 mol) of stearic acid and 160 g of isopropanol introduced at a rate of 200 ml/min.

After removing the alkanol as described in Example 1, 540 g of product are obtained which contains 5.05% by weight of aluminum and 0.4% by weight of isopropyl stearate. From the process 330 g of anhydrous isopropanol are recovered.

EXAMPLE 4

Example 3 is followed, except that the temperature of the circulating material flow is adjusted to 145° C.

In this way 542 g of product are obtained which contains 5.0% by weight of aluminum and 2.5% by weight of ester. From the process 326 g of turbid isopropanol are recovered which contains a white powder-like precipitate and 0.6% by weight of water.

EXAMPLE 5

910 kg (4.40 kmol) of aluminum isopropoxide and 1400 kg of hydrogenated (Soviet) heavy oil are weighed into an autoclave of 3.5 m³ volume fitted with a mechanical stirrer. This mixture is circulated at 110° C. under a pressure of $0.4 \times 10^5$ Pa under stirring through a tube reactor of 2 m in length and 0.04 m in diameter containing 32 saddleform spinning elements by means of a pump with a rated transfer output of 10 m³/hour. Into the circulating material flow, a solution at 60° C. temperature containing 1225 kg (4.3 kmol) of steraric acid, 74 kg (4.1 kmol) of water and 800 kg of isopropanol are added at a feeding rate of 450 l/hour through an injector built in before the tube reactor. The alkanol vapours formed are condensed by a condenser built in to the vacuum lead of the autoclave and collected in a receiver. After addition the temperature of the reactor is increased to 140° C. during 1 hour and the product is liberated from the alkanol for additional 30 minutes.

In this way 2880 kg of final product are obtained which contains 4.1% by weight of aluminum and 0.6% by weight of isopropyl stearate. The isopropanol recovered is anhydrous.

EXAMPLE 6

Example 5 is followed, except that, in addition to 1225 kg of stearic acid, 42 kg of water and for dissolution of these 800 kg of 96% ethanol are used while maintaining a pressure of $0.3 \times 10^5$ Pa in the tank reactor.

In this way a product is obtained which contains 0.8% by weight of isopropyl stearate and ethyl stearate. The alkanol mixture condensed is an anhydrous mixture of isopropanol and ethanol.

We claim:

1. A process for the preparation of an aluminum oxide carboxylate polymer of the Formula (I)

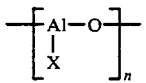

wherein

X is an organic acid radical of a $C_8$ to $C_{22}$ aliphatic monocarboxylic acid; and n is a number that is at least 16 designating the degree of polymerization, said aluminum oxide carboxylate polymer containing not more than 2% by weight of an ester by-product, which comprises the steps of:

(a) providing a solution of a $C_8$ to $C_{22}$ aliphatic monocarboxylic acid and water in a $C_2$ to $C_5$ alkanol;

(b) introducing a solution of an aluminum alkoxide of the Formula wherein

R is $C_2$ to $C_5$ alkyl, dissolved in an aromatic or aliphatic hydrocarbon, into a tank reactor kept under a pressure of 0.2 to $0.7 \times 10^5$ Pa, wherein the aromatic or aliphatic hydrocarbon must have a boiling point that is at least 80° C. higher than the boiling points of each of the $C_2$ to $C_5$ alkanol used as a solvent for the carboxylic acid and for the $C_2$ to $C_5$ alkanol which corresponds to the alkoxide component of the aluminum alkoxide;

(c) leading, as a circulated flow at a temperature exceeding by 15° to 50° C. the boiling point of the higher boiling alcohol between the first $C_2$ to $C_5$ alkanol employed as the solvent in step (a) and the second $C_2$ to $C_5$ alkanol corresponding to the alkoxide component of the aluminum alkoxide employed according to step (b), the solution of the aluminum alkoxide to a tube reactor having a 10 to 200 length/diameter ratio and connected to the tank reactor;

(d) simultaneously to step (c), feeding into the tube reactor the solution of the $C_8$ to $C_{22}$ aliphatic monocarboxylic acid and water in a $C_2$ to $C_5$ alkanol to react same with the solution of the aluminum alkoxide, whereby the aluminum/monocarboxylic acid molar ratio is at least 10:1 to form a foam phase reaction mixture containing the aluminum oxide carboxylate polymer of the Formula (I) and the $C_2$ to $C_5$ alkanols;

(e) leading the foam phase reaction mixture obtained in step (d) through the tube reactor at a rate of 1 to 10 m/sec back to the tank reactor and stirring said foam phase reaction mixture;

(f) removing the alkanols from the reaction mixture;

(g) returning the reaction mixture to the tube reactor;

(h) repeating steps (a) through (g) until the monocarboxylic acid/aluminum molar ratio reaches 0.95 to 1.05 and the water/aluminum molar ratio reaches 0.9 to 1.0 in the tank reactor; and (i) removing any additional alkanol present to obtain the desired product.

2. The process as claimed in claim 1 wherein according to step (b) the aromatic or aliphatic hydrocarbon is hydrogenated Soviet heavy oil with a viscosity of 100 mm²/sec at 40° C., a viscosity index of 85 and an aniline point of 99°/160° C.

3. A process as claimed in claim 1, which comprises carrying out the reaction in a tube reactor connected with the tank reactor.

4. A process as claimed in claim 1, step (d), which comprises feeding the alkanolic solution of the monocarboxylic acid and water at the entrance of the tube reactor.

5. A process as claimed in claim 1, step (d), which comprises using a solution containing at least 35% by weight of the $C_2$ to $C_5$ alkanol.

6. A process as claimed in claim 1, step (e), which comprises leading the foam phase obtained after the reaction of aluminum alkoxide with the carboxylic acid and water at a rate of 1 to 10 m/sec calculated as liquid phase through a tube reactor suitably fitted with guide elements increasing the turbulence and then introducing it to the tank reactor fitted with a stirrer.

7. A process as claimed in claim 1, step (b), which comprises maintaining a pressure of 0.2 to $0.5 \times 10^5$ Pa in the reactor.

8. A process as claimed in claim 1, step (d), which comprises circulating the mixture in the tube reactor, wherein the ratio of the molar flow of the aluminum compounds to the molar flow of the entering carboxylic acid and water is at least 20:1.

9. A process as claimed in claim 1, step (b), which comprises using aluminum isopropoxide as aluminum alkoxide and maintaining the tank reactor and tube reactor at a temperature of 105° to 125° C. during the reaction.

10. A process as claimed in claim 1, step (f), which comprises carrying out the removal of alkanol at a temperature at least by 30° C. higher than is the boiling point of the higher-boiling alkanol among the alkanol corresponding to the alkanol component of aluminum alkoxide and the alkanol used as solvent.

* * * * *